United States Patent
Efraimsson et al.

(10) Patent No.: US 10,704,596 B2
(45) Date of Patent: Jul. 7, 2020

(54) TOROIDAL ROLLER BEARING

(71) Applicant: Aktiebolaget SKF, Gothenberg (SE)

(72) Inventors: Linus Efraimsson, Askim (SE);
Prakash Gowdra Leelachandrappa, Bangalore (IN); Kishor Powar, Bangalore (IN); Gajula Balija Ranga, Bellary (IN); Lars Stigsjöö, Angered (SE); Vijay Tijare, Bangalore (IN)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/928,776

(22) Filed: Mar. 22, 2018

(65) Prior Publication Data
US 2018/0298944 A1   Oct. 18, 2018

(30) Foreign Application Priority Data

Apr. 12, 2017   (IN) .............................. 201741013102

(51) Int. Cl.
*F16C 23/08*   (2006.01)
*F16C 33/58*   (2006.01)
(Continued)

(52) U.S. Cl.
CPC ............ *F16C 23/08* (2013.01); *F16C 33/586* (2013.01); *F16C 35/062* (2013.01); *F16C 19/26* (2013.01)

(58) Field of Classification Search
CPC ...... F16C 35/06; F16C 35/061; F16C 35/063; F16C 35/067; F16C 35/07; F16C 35/073;
(Continued)

(56) References Cited

U.S. PATENT DOCUMENTS 2,719,046 A * 9/1955 Frederick .............. F16C 35/063
384/130
2,729,479 A * 1/1956 Leister .................. F16D 1/0817
384/539
(Continued)

FOREIGN PATENT DOCUMENTS

EP   2431623 A2 *   3/2012
FR   2981997 A1 *   5/2013
(Continued)

OTHER PUBLICATIONS

Machine Translation of JP 2015-148292 (Year: 2015).*
Machine Translation of JP-2006329331-A (Year: 2006).*
Machine Translation of JP-2015129548-A (Year: 2015).*

*Primary Examiner* — Alan B Waits
(74) *Attorney, Agent, or Firm* — Garcia-Zamor Intellectual Property Law, LLC; Ruy Garcia-Zamor; Bryan Peckjian (57) ABSTRACT

A toroidal roller bearing that provides an inner ring, an outer ring and a plurality of roller elements interposed in-between the inner and outer rings such that the rings rotate relative each other in relation to a rotational axle. The bearing is configured such that the inner ring and the outer ring are capable of being axially displaced and angularly misaligned relative each other in relation to the rotational axle. At least one of the inner or outer ring provides a recess in an axially extending section extending from one of its axial ends. The recess is arranged such that an axial gripping force can be generated onto the ring. In addition, the present disclosure provides a bearing arrangement that includes the bearing.

13 Claims, 4 Drawing Sheets

Fig. 1b (51) Int. Cl.
*F16C 35/06* (2006.01)
*F16C 19/26* (2006.01)

(58) Field of Classification Search
CPC .... F16C 35/077; F16C 41/04; F16C 2240/84; F16C 23/08; F16C 35/062; F16C 19/26; F16C 33/583
See application file for complete search history.

(56) References Cited

U.S. PATENT DOCUMENTS

| | | | | | |
|---|---|---|---|---|---|
| 4,222,705 | A | * | 9/1980 | Smith | F01D 25/125 384/317 |
| 4,622,860 | A | * | 11/1986 | Cametti | E02F 9/121 212/175 |
| 6,033,122 | A | * | 3/2000 | Kellstrom | F16C 23/08 384/563 |
| 8,814,436 | B2 | * | 8/2014 | Wendeberg | F16C 19/40 29/898.06 |
| 2001/0010738 | A1 | * | 8/2001 | Johnson | F16C 35/063 384/537 |
| 2003/0007708 | A1 | * | 1/2003 | Kullin | E06B 9/174 384/559 |
| 2003/0147572 | A1 | * | 8/2003 | Message | G01P 3/443 384/448 |
| 2007/0127859 | A1 | * | 6/2007 | Smook | F16C 19/26 384/569 |
| 2010/0061672 | A1 | * | 3/2010 | Dizlek | F16C 19/49 384/505 |
| 2011/0002767 | A1 | * | 1/2011 | Hestermann | B25J 9/104 414/744.1 |
| 2013/0301973 | A1 | * | 11/2013 | Wendeberg | F16C 19/40 384/551 |
| 2015/0098825 | A1 | * | 4/2015 | Wendeberg | F16C 33/4605 416/174 |
| 2015/0125104 | A1 | * | 5/2015 | Kullin | F16C 19/545 384/558 |
| 2015/0219076 | A1 | * | 8/2015 | Wendeberg | F16C 35/063 416/174 |
| 2016/0090966 | A1 | * | 3/2016 | Kullin | F03D 80/70 416/174 |
| 2016/0131183 | A1 | * | 5/2016 | Kullin | F16C 19/40 384/551 |
| 2016/0138648 | A1 | * | 5/2016 | Kellstrom | F16C 19/36 384/558 |

FOREIGN PATENT DOCUMENTS

| | | | | | |
|---|---|---|---|---|---|
| JP | 61252918 | A | * | 11/1986 | ............ F16C 35/063 |
| JP | 2005114029 | A | * | 4/2005 | ............ F16C 33/526 |
| JP | 2006329331 | A | * | 12/2006 | ............ F16C 41/045 |
| JP | 2008031941 | A | * | 2/2008 | ............ F16C 35/06 |
| JP | 2015129548 | A | * | 7/2015 | ............ F16C 35/062 |
| JP | 2015-148292 | A | * | 8/2015 | |

* cited by examiner

TOROIDAL ROLLER BEARING

CROSS-REFERENCE

This application claims priority to Indian patent application no. 201741013102 filed on Apr. 12, 2017, the contents of which are fully incorporated herein by reference.

TECHNOLOGICAL FIELD

According to a first aspect, the present invention relates to a toroidal roller bearing. More particularly, the present invention relates to a toroidal roller bearing which provides means for facilitating dismounting of the bearing from a bearing arrangement. According to a second aspect, the present invention relates to a bearing arrangement comprising the toroidal roller bearing according to the first aspect of the invention.

BACKGROUND

A toroidal roller bearing is a unique type of roller bearing which provides specific characteristics compared to other bearings. Especially, a toroidal roller bearing is known for its ability to allow for angular misalignment and axial displacement of its rings. An example of a toroidal roller bearing can for example be found in EP0175858A1.

A toroidal roller bearing can advantageously be used as a non-locating bearing in a bearing arrangement, wherein the bearing is designed to accommodate radial loads and no axial loads. A second bearing position of the arrangement may then be a locating bearing position, i.e. it may present a bearing which can accommodate radial and axial loads. Such a bearing can for example be a double row spherical roller bearing which is designed to accommodate radial and axial loads but also to allow for misalignment of the bearing's rings.

In certain situations, there may be a need to dismount an application after it has been in use for a period of time. This may be the case if there is a need to replace and/or refurbish certain components of the application. One example where it may be a need to perform regular maintenance is in a continuous casting machine, which provides a number of roll lines which are rotatably supported by bearings. An issue which may occur when the roll lines are dismounted is that certain components are destroyed to such an extent that they can not be reused. This may happen for a toroidal roller bearing when it is dismounted. Therefore, when the roll line is assembled again a new toroidal roller bearing has to be used which will lead to an increased cost for the machine owner.

As another example, there may be a need to dismount a toroidal roller bearing when the bearing has been incorrectly mounted to thereby correctly remount the bearing again.

Furthermore, due to the unique design of the toroidal roller bearing it is known that it occasionally may be difficult to dismount it. For example, the bearing may get stuck due to corrosion that is created between the shaft and the bearing during use, which will lead to that a very high pulling force will be required to remove the bearing. In addition, occasionally it may be difficult to remove the bearing due to e.g. space reasons and/or tight press fit of at least one of the bearing rings against its respective shaft or bearing housing. One method used to remove a toroidal roller bearing is known in WO2013176594, where a tool using magnetic forces is used for dismounting. However, there is room for improvements.

SUMMARY

In view of the above, an object of the present invention is to provide an improved toroidal roller bearing design which facilitates dismounting of the bearing. In addition, an object of the present invention is to eliminate or at least alleviate at least one of the drawbacks of the prior art.

The objects are achieved by the subject matter as specified in the independent claims. Preferred embodiments of the invention can be found in the dependent claims and in the accompanying description.

According to the first aspect thereof, the object is achieved by a toroidal roller bearing which comprises an inner ring and an outer ring, and a plurality of roller elements interposed in-between the inner and outer rings such that the rings can rotate relative each other in relation to a rotational axle. The toroidal roller bearing is configured such that the inner ring and the outer ring can be axially displaced and angularly misaligned relative each other in relation to the rotational axle. In addition, at least one of the inner or outer ring provides a recess in an axially extending section extending from one of its axial ends, which recess is arranged such that an axial gripping force can be generated onto the ring. In an embodiment, the recess is configured such that an axial gripping force which is sufficient for dismounting the bearing can be generated onto the ring.

The invention is based on the realization that it is possible to equip anyone of the rings with a recess which is adapted for dismounting the bearing. Due to the design of the toroidal roller bearing, i.e. the roller elements are arranged in-between the rings such that they can roll and be in contact with the rings on their complete axial width, a general understanding has been that any modification to the rings would lead to a significant reduction of the bearing's load bearing capability and also lead to a reduced service life. With the present invention, the bearing will be easier to dismount without an unfavorable performance reduction. In other words, the bearing will still be able to operate with a sufficient load bearing capability while it is equipped with a dismounting recess that significantly will facilitate a dismounting operation. Furthermore, the curved shape of the raceway surfaces does not provide a sufficient curvature in order to be able to generate a gripping force for dismounting. In an embodiment, the recess is an additional recess to the raceway surface of the ring.

The expressions axial and radial are used in this disclosure. Unless stated otherwise, an axial direction of the bearing or for anyone of its components means a direction that coincides with the rotational axle of the bearing or the component, respectively. Consequently, a radial direction is any direction which is perpendicular to the axial direction.

According to an embodiment of the present invention, the recess is a groove extending in at least a part of the circumference of the ring, which groove is located on a raceway surface for the roller elements of the ring. As previously mentioned, the invention is based on the realization that there can be a dismounting recess on the rings without significantly reducing the bearing's performance, but also it has been realized that such a recess also can be located on a raceway surface of the ring.

According to an embodiment of the present invention, the groove is extending in the complete circumference of the ring.

According to an embodiment of the present invention, the recess is at least one bore located on an axial side surface of the ring. The bore may be located in the vicinity of the raceway surface of the ring without significantly reducing the bearing's performance. According to another embodiment, the recess (e.g. a bore and/or a groove) may be located in the vicinity of the raceway surface of the ring without significantly reducing the bearing's performance.

According to an embodiment of the present invention, the at least one bore is extending axially.

According to an embodiment of the present invention, the at least one bore provides a thread. The thread may advantageously be used to connect a gripping tool to the bearing ring in order to generate a pulling force on the bearing that is sufficient for dismounting the bearing from a shaft or the like. According to one embodiment, the gripping tool comprises corresponding threaded screws for connecting the tool to the bearing.

According to an embodiment of the present invention, the axially extending section extends from the axial end by 5, 10, 15 or 20% of the axial width of the ring. It has further been realized that the recess may not be located too close to the axial center of the bearing, since normally the radial load acting on the bearing is largest at the bearing's axial center and reduces towards its axial ends. Thereby it is preferable to locate the recess as close to one of the ends as possible. This is also advantageous for being able to easily reach the recess by a gripping/dismounting tool. In a further embodiment of the present invention, the recess is located proximate to one of the axial ends of the ring.

According to an embodiment of the present invention, the toroidal roller bearing is configured such that: when the roller elements and the rings are angularly aligned and axially centered, then the recess is located such that the axially extending section is free from anyone of the roller elements. Each one of the rings and the roller elements provides and axial center. The axial center of each component can be defined by a radial plane which is perpendicular to the axial direction of the component and which is located in a middle, or center, point of the axial width of the component. The expression axially centered may be defined as the situation when the radial planes of each component coincides. By locating the recess as indicated above, the bearing's load capability will only be affected to a minor extent since the roller elements, in most occasions, may not come in contact with or be close to the recess.

According to an embodiment of the present invention, the bearing is a full complement bearing without any separators in-between the roller elements.

According to an embodiment of the present invention, the bearing further comprises at least one separator for separating at least two adjacent roller elements. The separators may for example be designed as individual spacers but they may also be part of a cage of the bearing.

According to an embodiment of the present invention, the bearing comprises more than one recess. For example, anyone of the rings may be equipped with dismounting recesses on both axial sides.

According to an embodiment of the present invention, when the recess is configured as a circumferential groove, a ring-shaped element is located in the recess. In an embodiment, the ring-shaped element may be used for generating a gripping force onto the bearing ring. If a radially extending ring-shaped element is placed in the groove it may be easier to dismount the bearing. In a further embodiment, the ring-shaped element is positioned in a circumferential groove on the inner ring of the bearing.

According to the second aspect thereof, the object is achieved by a bearing arrangement which comprises a shaft, a bearing housing and the toroidal roller bearing according to anyone of the embodiments of the first aspect of the invention. Moreover, the bearing is mounted in-between the shaft and the bearing housing, and any one of the inner ring or the outer ring is mounted with an interference fit between its respective shaft or bearing housing. It shall be noted that any embodiment of the second aspect of the invention is applicable and combinable to any of the embodiments of the first aspect of the invention and vice versa, unless specifically stated otherwise. The advantages and benefits of the second aspect of the invention are analogous the ones of the first aspect of the invention.

According to an embodiment of the second aspect of the present invention, the bearing arrangement is part of a roll line of a continuous casting machine.

BRIEF DESCRIPTION OF THE DRAWINGS

Exemplifying and preferred embodiments of the present invention will now be described more in detail, with reference to the accompanying drawings, wherein.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION

Figure 1A:
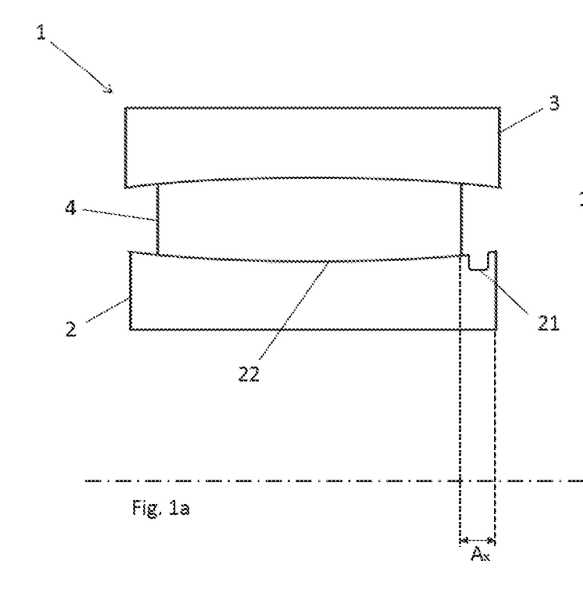
FIG. 1a shows a toroidal roller bearing according to an embodiment of the first aspect of the present invention.
Figure 1B:
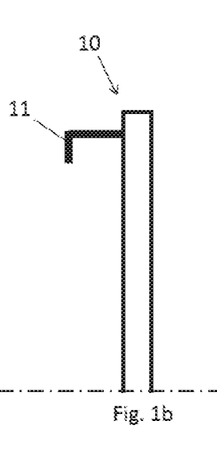
FIG. 1b shows a gripping tool according to an embodiment of the present invention.

In FIG. 1a a toroidal roller bearing 1 according to an embodiment of the present invention can be seen in a cross sectional view. The cross section is represented by a plane that coincides with a rotational axle A of the bearing 1. The bearing 1 comprises an inner ring 2, an outer ring 3, and a plurality of roller elements 4 interposed in-between the outer and inner rings, 3 and 2 respectively, such that the rings can rotate relative each other in relation to the rotational axle A. The toroidal roller bearing 1 is configured such that the inner ring 2 and the outer ring 3 can be axially displaced and angularly misaligned relative each other in relation to the rotational axle A. The inner ring 2 provides a recess 21 in an axially extending section Ax extending from the axial end on the right-hand side of the ring 2, which recess 21 is arranged such that an axial gripping force can be generated onto the ring 2. In this embodiment, the recess 21 is designed as a circumferential groove that extends around and encircles the inner ring 2. The recess 21 is further located on the raceway surface 22 of the inner ring. The groove provides a specific radial depth and axial width, wherein the size is made such that a gripping tool can be inserted therein. The gripping tool 10 may for example be designed with an L-shaped tool 11 as seen in FIG. 1b such that the tool 11 can be positioned in the groove 21 in order to generate an axial dismounting force. The L-shaped tool 11 may be designed as several separate circumferential sections, such as e.g. three sections, which are movable in the radial direction such that they can be inserted and removed from the groove 21 on the inner ring 2. In another embodiment, the L-shaped tool 11 may be used to pull off the bearing 1 via a ring-shaped element (not shown) which is positioned in the groove 21.

Figure 2:
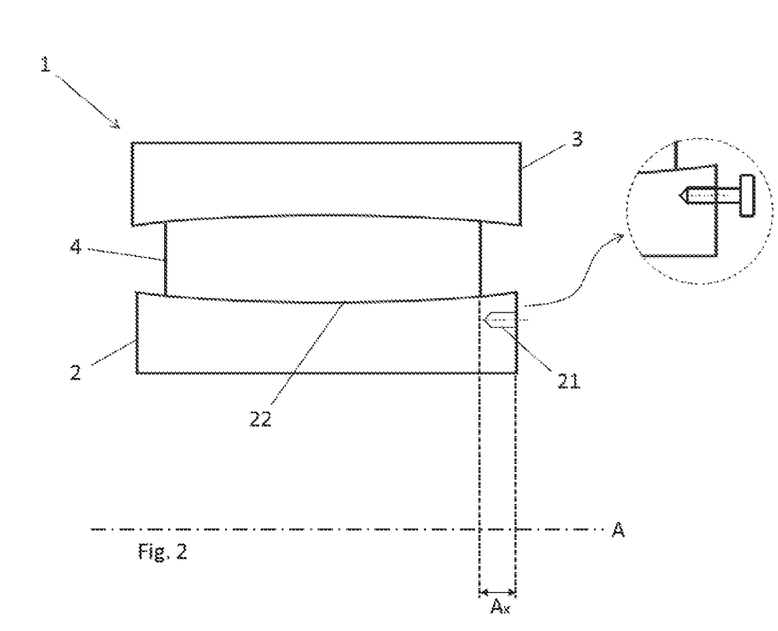
FIG. 2 shows a second toroidal roller bearing according to an embodiment of the first aspect of the present invention.

Now turning to FIG. 2, a cross section of a toroidal roller bearing 1 according to another embodiment of the first aspect of the present invention can be seen. The cross section is represented by a plane that coincides with a rotational axle A of the bearing 1. The bearing 1 comprises an inner ring 2, an outer ring 3, and a plurality of roller elements 4 interposed in-between the outer and inner rings, 3 and 2 respectively, such that the rings can rotate relative each other in relation to the rotational axle A. The toroidal roller bearing 1 is configured such that the inner ring 2 and the outer ring 3 can be axially displaced and angularly misaligned relative each other in relation to the rotational axle A. The inner ring 2 provides a recess 21 in an axially extending section Ax extending from the axial end on the right-hand side of inner ring 2, which recess 21 is arranged such that an axial gripping force can be generated onto the ring 2. In this specific embodiment, the recess 21 is configured as an axially extending bore that provides an internal thread in which bore a threaded screw can be fixated. The inner ring 2 may present a number of bores 21 located in its circumference. A gripping tool (not shown) may comprise a corresponding number of screws which can be screwed into the bores 21 in order to generate a dismounting force on the bearing 1.

In FIGS. 3a-3b to 7a-7b, respectively, other exemplifying embodiments of a toroidal roller bearing 1 according to the present invention can be seen. The figures present different toroidal roller bearing designs in cross sectional views and also in axial side views, respectively, to better illustrate the extension and shape of the recesses/grooves 21 of the respective bearing designs.

Figures 3A, 3B:
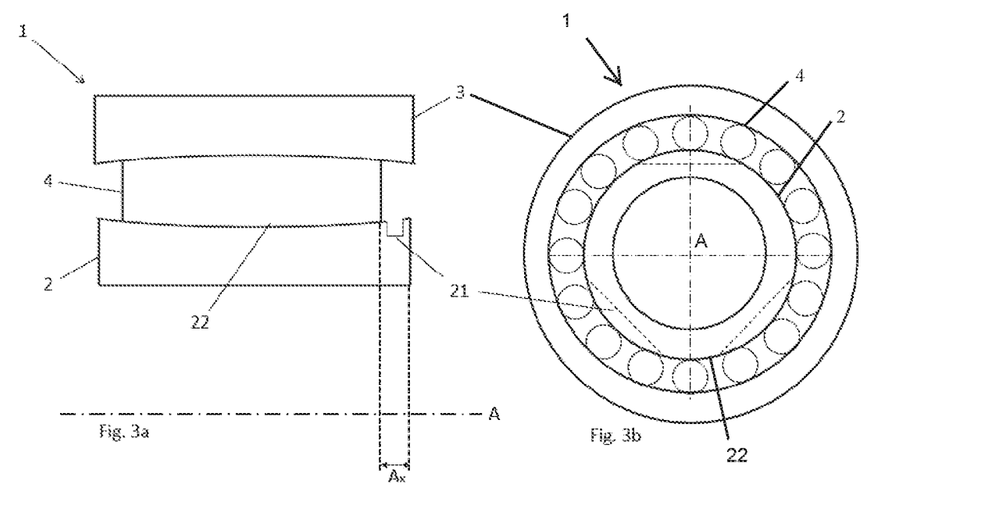
FIGS. 3a and 3b show a toroidal roller bearing according to a third embodiment of the present invention.

The bearing 1 in FIGS. 3a and 3b comprises an inner ring 2, an outer ring 3, and a plurality of roller elements 4 interposed in-between the outer and inner rings, 3 and 2 respectively, such that the rings can rotate relative each other in relation to the rotational axle A. The toroidal roller bearing 1 is configured such that the inner ring 2 and the outer ring 3 can be axially displaced and angularly misaligned relative each other in relation to the rotational axle A. The inner ring 2 provides a recess 21 in an axially extending section Ax extending from the axial end on the right-hand side of the ring 2, which recess 21 is arranged such that an axial gripping force can be generated onto the ring 2. In this embodiment, the recess 21 is designed as three separate circumferential grooves that respectively extends in a section of the inner ring 2, as can be seen in FIG. 3b. The recesses 21 are further located on the raceway surface 22 of the inner ring. The grooves 21 present a specific radial depth which varies over its circumferential extension and also a specific axial width, wherein the size is made such that a gripping tool can be inserted therein.

Figure 4A:
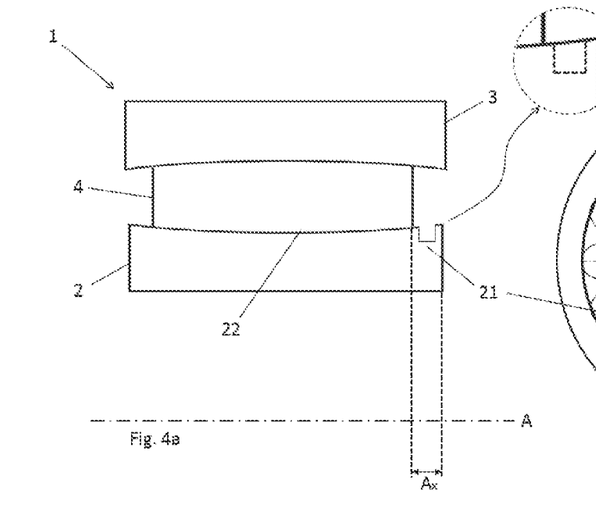
FIGS. 4a and 4b show a toroidal roller bearing according to a fourth embodiment of the present invention.
Figure 4B:
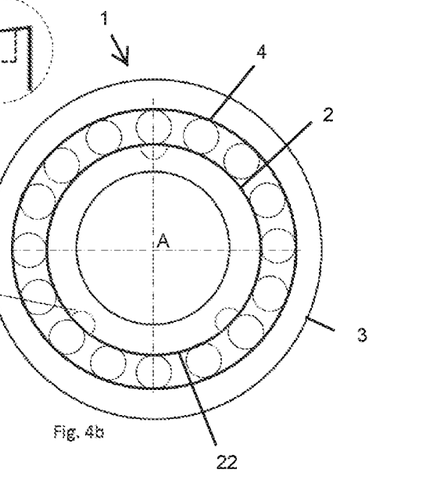

The bearing 1 in FIGS. 4a and 4b comprises an inner ring 2, an outer ring 3, and a plurality of roller elements 4 interposed in-between the outer and inner rings, 3 and 2 respectively, such that the rings can rotate relative each other in relation to the rotational axle A. The toroidal roller bearing 1 is configured such that the inner ring 2 and the outer ring 3 can be axially displaced and angularly misaligned relative each other in relation to the rotational axle A. The inner ring 2 provides a recess 21 in an axially extending section Ax extending from the axial end on the right-hand side of the ring 2, which recess 21 is arranged such that an axial gripping force can be generated onto the ring 2. In this embodiment, the recess 21 is designed as three separate grooves that respectively extends in a section of the inner ring 2, as can be seen in FIG. 4b. Moreover, the recesses 21 are in this embodiment made curved shaped in the tangential direction of the ring 2. The recesses 21 are further located on the raceway surface 22 of the inner ring. The grooves present a specific radial depth and axial width, wherein the size is made such that a gripping tool can be inserted therein. This embodiment is not limited to only three recesses 21. It is evident that also more or fewer recesses of this design could advantageously be used.

Figure 5A:
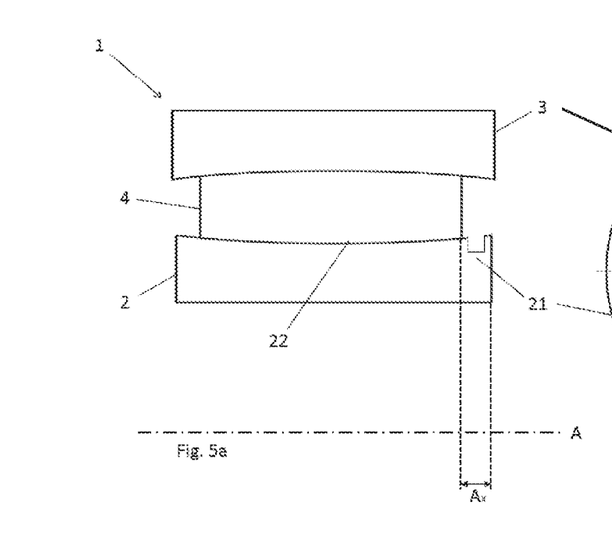
FIGS. 5a and 5b show a toroidal roller bearing according to a fifth embodiment of the present invention.
Figure 5B:
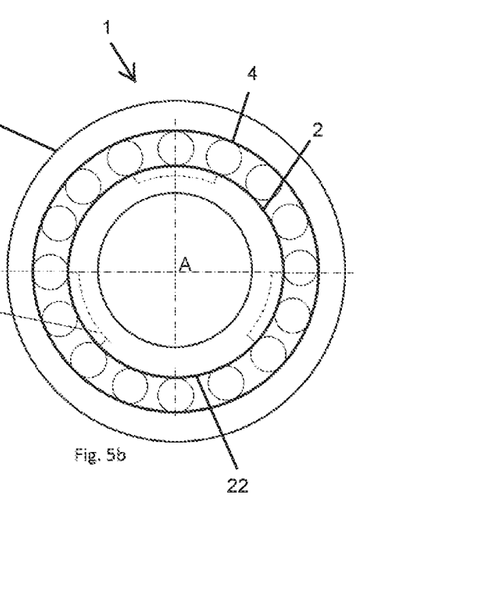

The bearing 1 in FIGS. 5a and 5b comprises an inner ring 2, an outer ring 3, and a plurality of roller elements 4 interposed in-between the outer and inner rings, 3 and 2 respectively, such that the rings can rotate relative each other in relation to the rotational axle A. The toroidal roller bearing 1 is configured such that the inner ring 2 and the outer ring 3 can be axially displaced and angularly misaligned relative each other in relation to the rotational axle A. The inner ring 2 provides a recess 21 in an axially extending section Ax extending from the axial end on the right-hand side of the ring 2, which recess 21 is arranged such that an axial gripping force can be generated onto the ring 2. In this embodiment, the recess 21 is designed as three separate circumferential grooves that respectively extends in a section of the inner ring 2, as can be seen in FIG. 5b, wherein the grooves 21 present an essentially similar radial depth along the extensions of the grooves. The recesses 21 are further located on the raceway surface 22 of the inner ring. The grooves present a specific radial depth and axial width, wherein the size is made such that a gripping tool can be inserted therein.

Figure 6A:
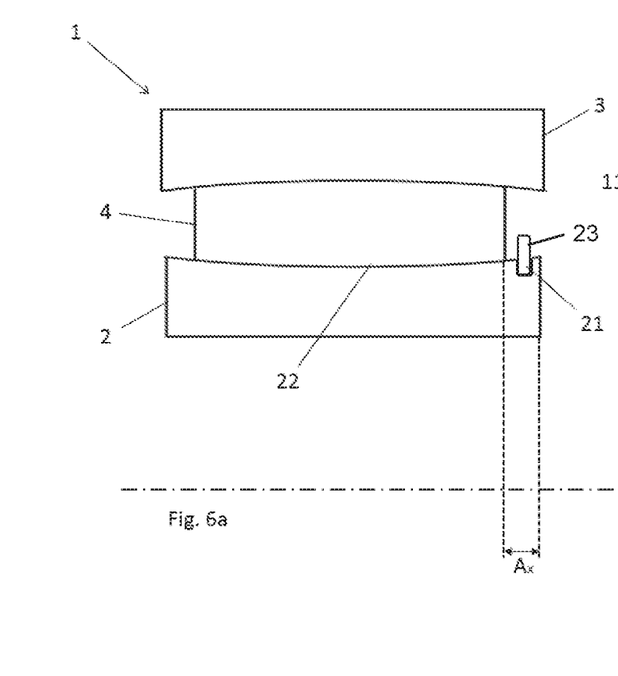
FIGS. 6a and 6b show a toroidal roller bearing and a gripping tool, respectively, according to a sixth embodiment of the present invention.
Figure 6B:
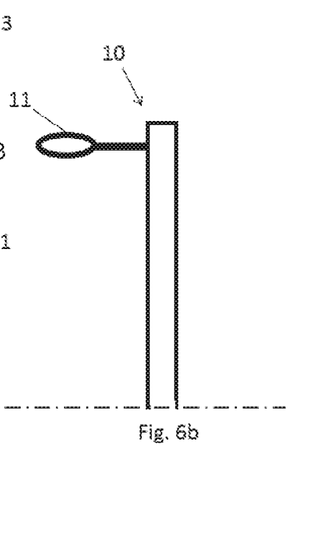

The bearing 1 in FIG. 6a comprises an inner ring 2, an outer ring 3, and a plurality of roller elements 4 interposed in-between the outer and inner rings, 3 and 2 respectively, such that the rings can rotate relative each other in relation to the rotational axle A. The toroidal roller bearing 1 is configured such that the inner ring 2 and the outer ring 3 can be axially displaced and angularly misaligned relative each other in relation to the rotational axle A. The inner ring 2 provides a recess 21 in an axially extending section Ax extending from the axial end on the right-hand side of the ring 2, which recess 21 is arranged such that an axial gripping force can be generated onto the ring 2. In this embodiment, the recess 21 is designed as a circumferential groove. Furthermore, in the groove 21 is a ring-shaped element 23 positioned. The ring-shaped element 23 is configured such that a gripping tool 10 can generate a dismounting force onto the bearing 1 via a the tool 11. The ring-shaped element 23 may be designed as one circumferentially extending ring element, but in alternative embodiments it may also be separate ring sections positioned in one or several grooves 21, respectively. The tool 11 in FIG. 6b is designed with a "loop"-shape, but the tool may of course have any suitable shape for being able to get a sufficient grip onto the ring-element 23.

Figures 7A, 7B:
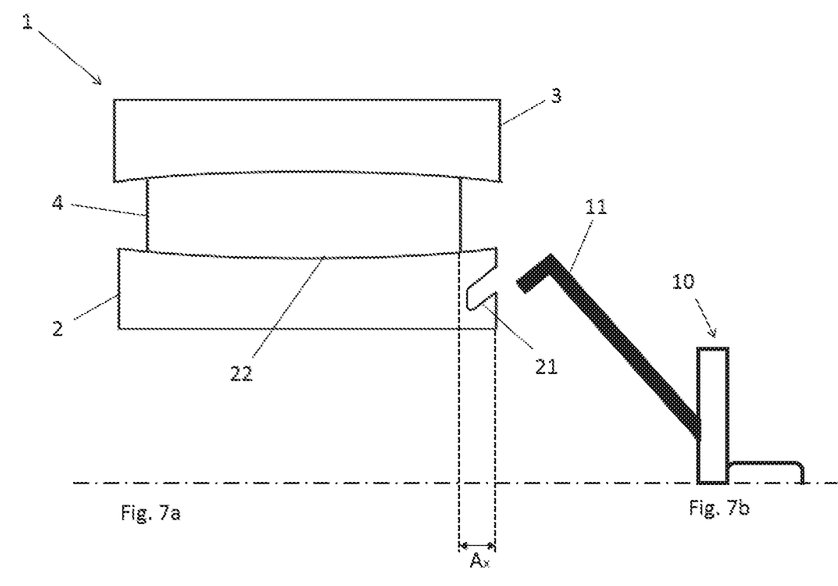
FIGS. 7a and 7b show a toroidal roller bearing and a gripping tool, respectively, according to a seventh embodiment of the present invention.

The bearing 1 in FIG. 7a comprises an inner ring 2, an outer ring 3, and a plurality of roller elements 4 interposed in-between the outer and inner rings, 3 and 2 respectively, such that the rings can rotate relative each other in relation to the rotational axle A. The toroidal roller bearing 1 is configured such that the inner ring 2 and the outer ring 3 can be axially displaced and angularly misaligned relative each other in relation to the rotational axle A. The inner ring 2 provides a recess 21 in an axially extending section Ax extending from the axial end on the right-hand side of the ring 2, which recess 21 is arranged such that an axial gripping force can be generated onto the ring 2. In this embodiment, the recess 21 is designed as a circumferential groove which is located on the axial side surface of the ring 2. The groove 21 is inclined in relation to the rotational axle A in order to be able to generate a gripping force by the tool 10, 11 as seen in FIG. 7b. The tool 11 in FIG. 7b is designed with an L-shape, but the tool may of course have any suitable shape for being able to get a sufficient grip in the groove 21.

Figure 8:
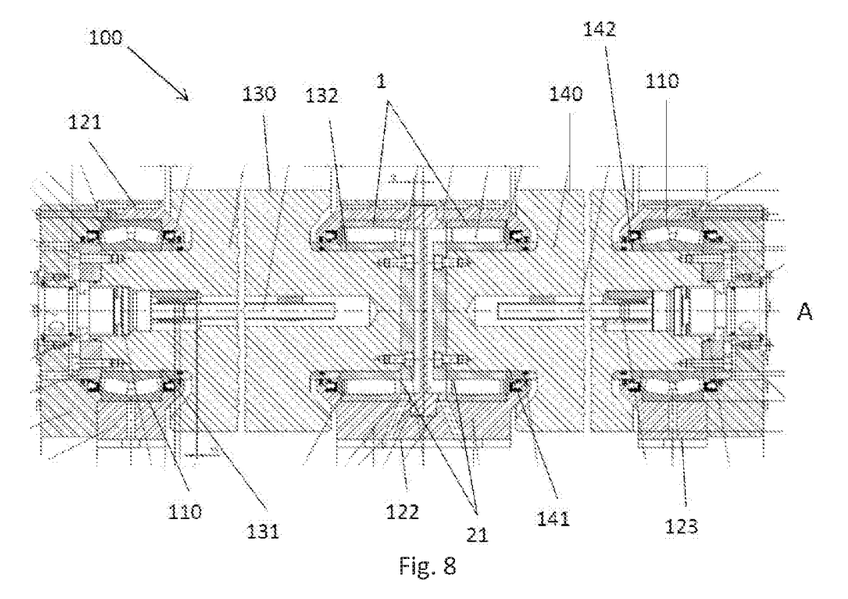
FIG. 8 shows a bearing arrangement according to an embodiment of the second aspect of the present invention.

In FIG. 8 a cross sectional view of a bearing arrangement 100 according to an embodiment of the second aspect of the present invention can be seen. In this embodiment, the bearing arrangement 100 is part of a roll line for a continuous casting machine. The roll line comprises a first and a second roll body, 130 and 140 respectively, which first roll body comprises a first and a second shaft end, 131 and 132 respectively, and which second roll body comprises a third and a fourth shaft end, 141 and 142 respectively. The roll line further comprises three bearing housings, 121, 122 and 123 respectively. The roll bodies, 130 and 140, are rotatably supported by the bearing housings via rolling bearings in relation to a rotational axis A. The rolling bearings are two double row spherical roller bearings 110 and two toroidal roller bearings 1. The toroidal roller bearings 1 of the roll line present recesses 21 according to any embodiment of the first aspect of the invention in order to facilitate dismounting therefrom. As can be seen, there is not much space available for being able to get a good grip of the bearings, and therefore the recess 21 according to the invention will significantly facilitate the dismounting process. The recesses 21 may preferably be located at the outer ends of the shaft ends, 132 and 141 respectively. Further, for this application, the toroidal roller bearings 1 are mounted with an interference fit onto the shaft ends of the roll bodies, 130 and 140 respectively. Therefore it is crucial to be able to get a good grip for dismounting. In addition, for continuous casting, which is a very demanding process with a harsh environment, the bearings may get stuck onto the shaft ends due to the creation of corrosion in-between the bearing and the shaft ends and/or the bearing housings. With the recess according to the present invention the bearing can be dismounted easily even if there is corrosion present.

The invention is not limited to the embodiments described herein. It would be evident for the skilled person that other embodiments and modifications to the embodiments specified hereinabove are also possible within the scope of the claims. For example, the bearing arrangement is not only limited to continuous casting, but can also be used for any other application wherein a toroidal roller bearing is used. In addition, it is evident that any embodiment of the recess described herein may be located on any one of the inner or outer ring of the bearing, respectively, and further on any side of the bearing, left or right, respectively.

What is claimed is:

1. A toroidal roller bearing, comprising:
a first ring having a first ring axial width and a first raceway surface, the first raceway surface being arcuately shaped,
a second ring
a plurality of roller elements interposed in-between the first ring and second ring such that the rings rotate relative each other in relation to an axis of rotation, wherein
the toroidal roller bearing is configured such that the first ring and the second ring are capable of being axially displaced and angularly misaligned relative each other in relation to the axis of rotation, and wherein
the first ring provides a recess in a portion of the first raceway surface such that when the first ring and the second ring are axially aligned the plurality of roller elements and the recess are axially spaced from each other along the first raceway surface, the recess being arranged such that an axial gripping force can be generated onto the ring such that the axial gripping force is exerted in a direction parallel to the axis of rotation of each of the plurality of rolling elements when the first and second rings are axially aligned, the second ring axially overlaps all of the first ring and the recess in the first ring when the first ring and the second ring are not axially displaced from each other, the first raceway surface extending in a continuous fashion along the inner ring up to the recess and continuing past the recess.

2. The toroidal roller bearing according to claim 1, wherein the recess is a groove extending in at least a part of the circumference of the first ring, the groove being located on a raceway surface for the roller elements of the first ring.

3. The toroidal roller bearing according to claim 2, wherein the groove is extending in the complete circumference of the first ring.

4. The toroidal roller bearing according to claim 1, wherein when the first and second rings are axially aligned the first raceway extends past each axial end of the plurality of rolling elements such that an axially extending section of the first raceway extends past the each axial end by a distance measured in the axial direction that is five percent (5%) of the first ring axial width.

5. The toroidal roller bearing according to claim 1, wherein the toroidal roller bearing is configured such that, when the roller elements and the rings are angularly aligned and axially centered, then the recess is located such that the axially extending section is free from one of the roller elements.

6. The toroidal roller bearing according to claim 1, wherein the bearing is a full complement bearing without any separators in-between the roller elements.

7. The toroidal roller bearing according to claim , wherein the bearing further comprises at least one separator for separating at least two adjacent roller elements.

8. A bearing arrangement, comprising:
a shaft,
a bearing housing,
the toroidal roller bearing according to claim 1, wherein the bearing is mounted in-between the shaft and the bearing housing, and wherein
one of the first ring or the second ring is mounted with an interference fit between its respective shaft or bearing housing.

9. The toroidal roller bearing according to claim 1, when the first and second rings are axially aligned the first raceway extends past each axial end of the plurality of rolling elements such that an axially extending section of the first raceway extends past the each axial end by a distance measured in the axial direction that is ten percent (10%) of the first ring axial width.

10. The toroidal roller bearing according to claim 1, wherein when the first and second rings are axially aligned the first raceway extends past each axial end of the plurality of rolling elements such that an axially extending section of the first raceway extends past the each axial end by a distance measured in the axial direction that is fifteen percent (15%) of the first ring axial width.

11. The toroidal roller bearing according to claim 1, wherein when the first and second rings are axially aligned the first raceway extends past each axial end of the plurality of rolling elements such that an axially extending section of the first raceway extends past the each axial end by a distance measured in the axial direction that is twenty percent (20%) of the first ring axial width.

12. A toroidal roller bearing, comprising:
a first ring having a first ring axial width and a first raceway surface, the first raceway surface being arcuately shaped,
a second ring,
a plurality of roller elements interposed in-between the first ring and second ring such that the rings rotate relative each other in relation to an axis of rotation,
wherein the toroidal roller bearing is configured such that the first ring and the second ring are capable of being axially displaced and angularly misaligned relative each other in relation to the axis of rotation, and
wherein the first ring provides a recess,
wherein the recess is at least one bore located on an axial side surface of the first ring and
wherein the recess is inclined with respect to the axis of rotation.

13. The toroidal roller bearing according to claim 12, wherein the recess is configured to receive an L-shaped gripping tool.

* * * * *